United States Patent [19]
Oku

[11] Patent Number: 5,146,364
[45] Date of Patent: Sep. 8, 1992

[54] OPTICAL INSTRUMENT FOR PRODUCING ARTIFICIAL RAINBOWS

[76] Inventor: Kimio Oku, 12-10, Kumata 7-chome, Sumiyoshi-ku, Osaka, Japan

[21] Appl. No.: 666,304

[22] Filed: Mar. 8, 1991

[30] Foreign Application Priority Data

Mar. 9, 1990 [JP] Japan .................................. 2-59133

[51] Int. Cl.$^5$ .......................... G02B 5/04; G02B 7/18; G02B 27/00
[52] U.S. Cl. ............................. 359/615; 359/503/837
[58] Field of Search ............... 350/168, 286, 287, 574, 350/447; 359/615

[56] References Cited

U.S. PATENT DOCUMENTS

| | | | |
|---|---|---|---|
| 4,214,297 | 7/1980 | Kuhn et al. | 350/168 |
| 4,557,055 | 12/1985 | Arai | 353/81 |
| 4,681,402 | 7/1987 | Tiffany | 362/311 |
| 4,849,866 | 7/1989 | Mori | 350/168 |

*Primary Examiner*—Jon W. Henry
*Attorney, Agent, or Firm*—Edwin E. Greigg; Ronald E. Greigg

[57] ABSTRACT

This invention is directed to an optical instrument including a prism and a convex reflective surface for producing artificial rainbows which is used for a display in halls of entertainment as well as in shops and for interior decoration. Comparatively small optical instruments can also be used as a toy.

3 Claims, 2 Drawing Sheets

OPTICAL INSTRUMENT FOR PRODUCING ARTIFICIAL RAINBOWS

BACKGROUND OF THE INVENTION

The present invention refers to an optical instrument for producing artificial rainbows which is used for a display in halls of entertainment or in shops or for an interior decoration. A comparatively small one can also be used as a toy.

One type of an optical instrument for producing artificial rainbows has already been employed to project a rainbow on walls or other places and to display a tasteful design with much novelty.

However, while a natural rainbow is an annulus in itself and appears to be a semicircular annulus to our sight, an artificial rainbow A produced by an already known optical instrument for producing artificial rainbows appears as an arc of a circle, as shown in FIG. 3, and its appearance is different from a natural rainbow because the intervals of each color are narrowed at each end of the artificial rainbow A.

SUMMARY OF THE INVENTION

The present invention solves the above problem and an object is to overcome the above problems and to provide an optical instrument for producing artificial rainbows of simple construction which produces an optical artificial rainbow which appears to be almost the same as a natural rainbow.

DETAILED DESCRIPTION OF THE PREFERRED EMBODIMENT

Figure 1:
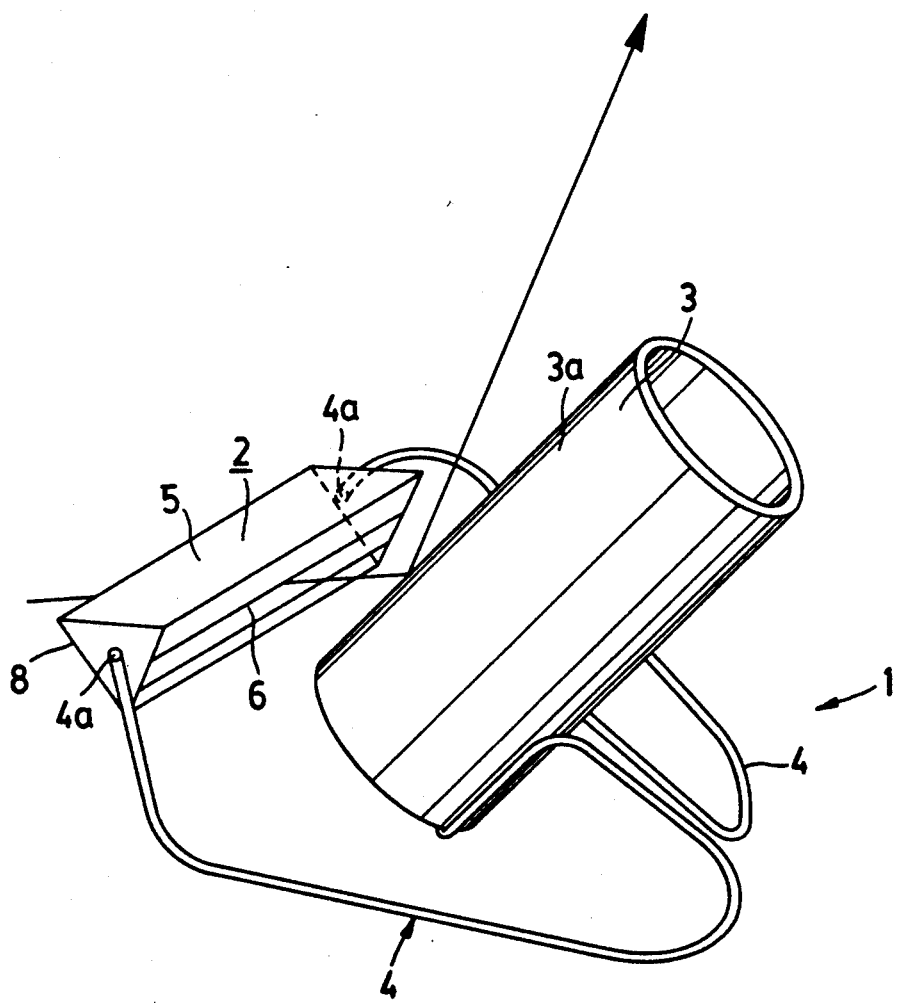
FIG. 1 shows a perspective view of an embodiment of the present invention.
Figure 2:
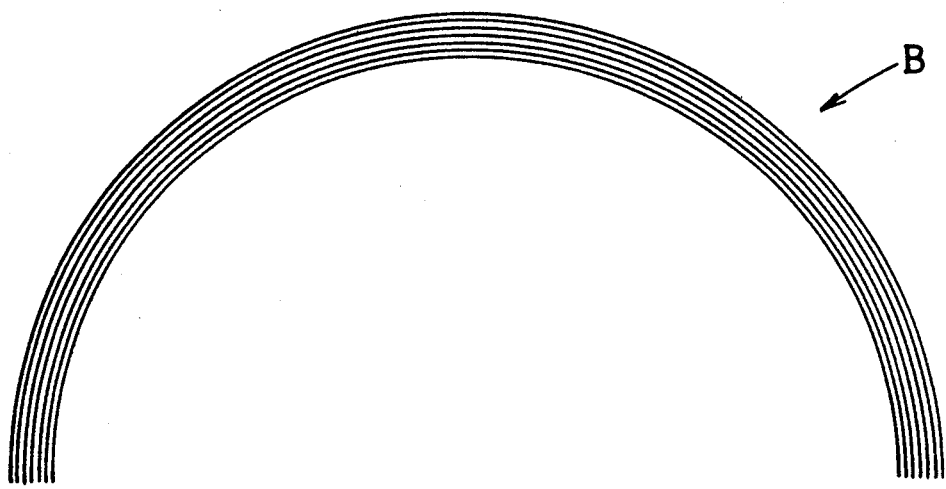
FIG. 2 is a descriptive drawing showing an artificial rainbow produced by the optical instrument of this invention for producing artificial rainbows.
Figure 3:
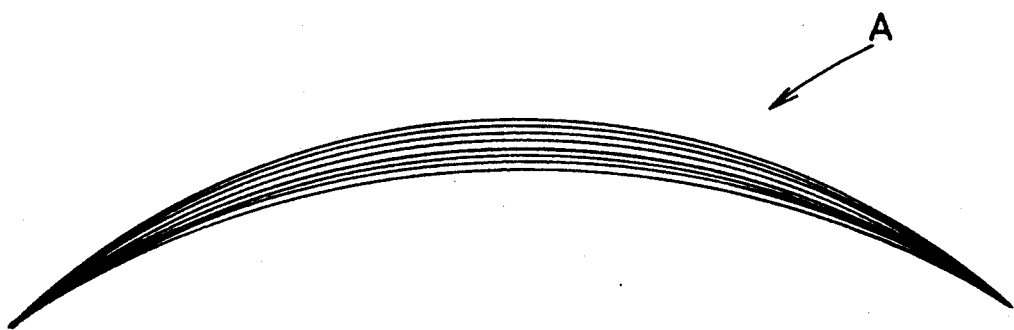
FIG. 3 is a descriptive drawing showing an artificial rainbow produced by an optical instrument for producing artificial rainbows that is already known.

Following is a description of an embodiment of the present invention.

The numeral 1 refers to an optical instrument for producing artificial rainbows pertaining to the present invention comprising a prism 2, a convex mirror 3 and a supporting device 4. In this embodiment, the convex mirror is a cylinder whose surface 3a is mirrored.

A supporting device 4 supports the prism 2 and the convex mirror 3 at a predetermined angle relative to each other, and at a predetermined distance between the prism 2 and the convex mirror 3, and the convex mirror 3 is set at an angle of approximately 45 degrees relative to the vertical direction and has a diameter of about 5 cm with a length of about 10 cm. The prism is an equilateral prism having end faces with 2.5 cm edges with the length of the prism about 7.0 cm.

As shown in FIG. 1, the prism 2 is of an equilateral triangular shape and supported on its end faces by two ends 4a of the supporting device 4 so that an apex of the prism is downward with one face 5 of the equilateral triangle facing upwardly and in a horizontal plane. The prism is spaced about 5 cm from the cylinder. With the spacing indicated, a rainbow of from 6 to 7cm in width will be projected onto a wall from about 150 to 200cm from the mirror.

As an illuminant, solar light is usually preferred but a light from a light source can be substituted for solar light. An incident light on face 8 passes through the prism 2 and is refracted by face 6 onto the mirror surface 3a of the convex mirror 3. The light rays are dispersed by the prism and refracted into the mirror surface which reflects the light incident on the mirror surface onto a wall, a ceiling, or where directed.

The light is reflected by the surface 3a of the convex mirror 3 and becomes a spectrum of an annulus semicircle and, therefore, projects an optical artificial rainbow on a desired surface.

Light that is separated by going through the prism is refracted by the prism face onto the surface 3a of the convex mirror 3 and the convex mirror reflects the light onto a surface as an artificial rainbow B. The artificial rainbow B has light dispersion intervals which are produced according to each wavelength. This produced artificial rainbow B is projected on walls or ceilings, as a display in a shop, or an interior decoration in a house.

It will be obvious to one skilled in the art that the size and spacing may be changed for different sized rainbows and instead of a cylindrical mirror the mirror may be semi-cylindrical.

What is claimed is:

1. An optical instrument for producing artificial rainbows which comprises an elongated, equilateral prism having a left and right side and a convex mirror supported by the same supporting device with the convex mirror supported on the right side of said prism so that the convex mirror is positioned at a 45 degree angle relative to a vertical line with the prism, a predetermined distance from the convex mirror, said prism is positioned such that a light incident on one face of the prism from said left side along a horizontal plane passes through the prism and is refracted by an opposite face onto the mirror surface which reflects the incident light in the form of an artificial rainbow on a surface spaced from said convex mirror.

2. An optical instrument for producing artificial rainbows as set forth in claim 1 wherein said prism is spaced about 5 cm from the convex mirror and said convex mirror is a circular section having a diameter of about 5 cm and a length of about 10 cm.

3. An optical instrument for producing artificial rainbows as set forth in claim 2 in which said prism face through which light is refracted onto said convex mirror is about one-fourth the length of the convex mirror surface.

* * * * *

UNITED STATES PATENT AND TRADEMARK OFFICE
CERTIFICATE OF CORRECTION

PATENT NO. : 5,146,364
DATED : September 8, 1992
INVENTOR(S) : Kimio Oku

It is certified that error appears in the above-identified patent and that said Letters Patent is hereby corrected as shown below:

Title page:

Item: [76] Inventor: Kimio Oku, 12-10, Kumata 7-chome, Higashisumiyoshi-ku, Osaka, Japan Signed and Sealed this Twenty-first Day of December, 1993

Attest:

BRUCE LEHMAN

*Attesting Officer*  *Commissioner of Patents and Trademarks*